(12) United States Patent
Jung et al.

(10) Patent No.: US 11,779,181 B2
(45) Date of Patent: Oct. 10, 2023

(54) VACUUM CLEANER AND METHOD FOR CONTROLLING VACUUM CLEANER

(71) Applicant: Samsung Electronics Co., Ltd., Suwon-si (KR)

(72) Inventors: Bumun Jung, Suwon-si (KR); Kyoungwoung Kim, Suwon-si (KR); Yongdae Lee, Suwon-si (KR); Seungmoo Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/835,406

(22) Filed: Jun. 8, 2022

(65) Prior Publication Data

US 2022/0296066 A1    Sep. 22, 2022

Related U.S. Application Data

(63) Continuation of application No. 16/637,924, filed as application No. PCT/KR2019/005660 on May 10, 2019, now Pat. No. 11,369,244.

(30) Foreign Application Priority Data

May 18, 2018    (KR) .......................... 10-2018-0056968

(51) Int. Cl.
   *A47L 9/28*    (2006.01)
(52) U.S. Cl.
   CPC ........... *A47L 9/2831* (2013.01); *A47L 9/2842* (2013.01); *A47L 9/2847* (2013.01); *A47L 9/2857* (2013.01); *A47L 9/2884* (2013.01)

(58) Field of Classification Search
   CPC .... A47L 9/2831; A47L 9/2842; A47L 9/2847; A47L 9/2857; A47L 9/2884; A47L 9/0477; A47L 9/04; A47L 9/0411; Y02B 40/00; H02P 5/46
   See application file for complete search history.

(56) References Cited

U.S. PATENT DOCUMENTS

| | | |
|---|---|---|
| 5,243,732 A | 9/1993 | Koharagi et al. |
| 6,925,679 B2 | 8/2005 | Wallach et al. |
| 9,301,665 B2 | 4/2016 | Clothier et al. |
| 9,763,551 B2 | 9/2017 | Murchie et al. |
| 9,801,516 B2 | 10/2017 | Zheng et al. |
| 9,901,236 B2 | 2/2018 | Halloran et al. |

(Continued)

FOREIGN PATENT DOCUMENTS

| | | |
|---|---|---|
| CN | 1069133 A | 2/1993 |
| CN | 1942130 A | 4/2007 |

(Continued)

OTHER PUBLICATIONS

Korean Office Action dated Nov. 12, 2019, issued in Korean Application No. 10-2018-0056968.

(Continued)

*Primary Examiner* — David Redding
(74) *Attorney, Agent, or Firm* — Jefferson IP Law, LLP (57) ABSTRACT

Disclosed is a vacuum cleaner. The present vacuum cleaner includes a drum mounted with a brush, a first motor for rotating the drum, a sensor for sensing a load applied to the first motor, a second motor generating suction pressure, and a processor for controlling at least one from the first motor and the second motor according to a size of a load sensed from the sensor.

14 Claims, 8 Drawing Sheets

(56) References Cited

U.S. PATENT DOCUMENTS

| | | |
|---|---|---|
| 2002/0174506 A1 | 11/2002 | Wallach et al. |
| 2005/0065662 A1 | 3/2005 | Reindle et al. |
| 2006/0130270 A1 | 6/2006 | Tondra et al. |
| 2008/0022485 A1 | 1/2008 | Grey |
| 2010/0229892 A1 | 9/2010 | Reese et al. |
| 2010/0269857 A1 | 10/2010 | Assmann et al. |
| 2014/0366286 A1 | 12/2014 | Zheng et al. |
| 2017/0036183 A1 | 2/2017 | Xiang et al. |
| 2018/0184867 A1 | 7/2018 | Sun et al. |

FOREIGN PATENT DOCUMENTS

| | | |
|---|---|---|
| EP | 0 527 567 A2 | 2/1993 |
| EP | 0458057 B1 | 2/1995 |
| JP | H03-295527 A | 12/1991 |
| JP | 05-056898 A | 3/1993 |
| JP | 05176872 A | 7/1993 |
| JP | 07143945 A | 6/1995 |
| JP | 10-328103 A | 12/1998 |
| JP | 2002248070 A | 9/2002 |
| JP | 2003-135320 A | 5/2003 |
| JP | 2004-529686 A | 9/2004 |
| JP | 2010-057530 A | 3/2010 |
| JP | 2012152303 A | 8/2012 |
| JP | 2012217787 A | 11/2012 |
| KR | 0133057 B1 | 4/1998 |
| KR | 10-0161987 B1 | 12/1998 |
| KR | 10-0188898 B1 | 6/1999 |
| KR | 10-0565260 B1 | 3/2006 |
| KR | 10-2008-0084995 A | 9/2008 |
| KR | 10-0963753 B1 | 6/2010 |
| KR | 10-1779868 B1 | 9/2017 |
| KR | 10-1823450 B1 | 1/2018 |

OTHER PUBLICATIONS

Korean Decision to Grant dated Mar. 30, 2020, issued in Korean Application No. 10-2018-0056968.
Extended European Search Report dated Jul. 3, 2020, issued in European Application No. 19804511.4.
Chinese Office Action dated Dec. 9, 2020, issued in Chinese Application No. 201980004042.3.
European Search Report dated Feb. 1, 2021, issued in European Patent Application No. 19804511.4.
Korean Office Action dated Jun. 7, 2021, issued in Korean Patent Application No. 10-2020-0080290.
Extended European Search Report dated Jul. 7, 2021, issued in European Patent Application No. 21177966.5-1016.
Korean Office Action dated Feb. 9, 2022, issued in Korean Patent Application No. 10-2020-0080290.
Extended European Search Report dated Jan. 23, 2023, issued in European Patent Application No. 22208265.3.

VACUUM CLEANER AND METHOD FOR CONTROLLING VACUUM CLEANER

CROSS-REFERENCE TO RELATED APPLICATION(S)

This application is a continuation application of prior application Ser. No. 16/637,924, filed on Feb. 10, 2020, which is a U.S. National Stage application under 35 U.S.C. § 371 of an International application number PCT/KR2019/005660, filed on May 10, 2019, which is based on and claims priority of a Korean patent application number 10-2018-0056968, filed on May 18, 2018, in the Korean Intellectual Property Office, the disclosure of which is incorporated by reference herein in its entirety.

TECHNICAL FIELD

The present disclosure is directed to a vacuum cleaner and a method for controlling a vacuum cleaner, more specifically to vacuum cleaner capable of controlling an operation of a motor adaptively according to a load of the motor rotating a drum mounted with a brush and a method for controlling thereof.

BACKGROUND ART

A vacuum cleaner includes a main body of a cleaner installed with a vacuum suction apparatus and a dust collecting apparatus and a suction module coupled to the main body. Recently, a rotating brush is installed on a suction module for easily suctioning impurities on a surface to be cleaned.

However, a load applied to a motor driving the brush according to an environment of the surface to be cleaned may be varied. Also, a size of a current provided to the motor driving the brush according to the varying loads is also changed, but there is a disadvantage of not being able to control an operation of the motor adaptively thereto.

DISCLOSURE

Technical Problem

To overcome the above-described problems, the present disclosure is directed to providing a vacuum cleaner capable of controlling an operation of a motor adaptively according to a load of the motor rotating a drum mounted with a brush and a method of controlling thereof.

Technical Solution

According to an embodiment of the present disclosure to achieve the above object, the vacuum cleaner includes a drum mounted with brush, a first motor for rotating the drum, a sensor for sensing a load applied to the first motor, a second motor generating a suction pressure, and a processor for controlling at least one from the first motor and the second motor according to a size of the load sensed from the sensor.

The processor may, based on the load sensed from the sensor being a first threshold value or more, reduce a speed of the second motor.

The processor may, based the load sensed from the sensor being a second threshold value or smaller than a first threshold value, reduce a speed of the first motor.

The processor may, based on the load sensed from the sensor being the second threshold value or more, reduce the speed of the first motor to 60% to 80% than a current speed.

The processor may, based on the load sensed from the sensor being the second threshold value or more, control the first motor for the speed of the first motor to have a speed inversely proportional to a size of the load sensed from the sensor.

The processor may, based on the load sensed from the sensor being a third threshold value or greater than a first threshold value, terminate driving of the first motor.

The present vacuum cleaner further includes a main body including the second motor and a suction module mounted to be detachable from the main body, and including the drum and the first motor, and the processor may confirm a type of the suction module, and control the speed of the second motor based on a threshold value corresponding to the confirmed type.

The present vacuum cleaner further includes a user interaction part, and the user interaction unit may, based on a load sensed from the sensor being a first threshold value or more, provide a notification guiding to replace to a suction module of a relatively lesser load than a currently mounted suction module.

The present vacuum cleaner may further include the second motor and a secondary battery for providing power to the second motor.

A control method of a vacuum cleaner according to one embodiment of the present disclosure includes, based on a driving instruction being input, generating suction pressure using a second motor, rotating a drum mounted with a brush using a first motor, sensing a load applied to the first motor, and controlling at least one from the first motor and the second motor according to the size of the sensed load.

The controlling may include, based on the load sensed from the sensor being a first threshold value or more, reducing the speed of the second motor and based on the sensed load being a second threshold value or smaller than a first threshold value, reducing the speed of the first motor.

The controlling may include, based on the load sensed from the sensor being a second threshold value or smaller than a first threshold value, reducing the speed of the first motor.

The controlling may include, based on the load sensed from the sensor being the second threshold value or more, reducing the speed of the first motor to 60% to 80% than a current speed.

The controlling may include, based on the load sensed from the sensor being the second threshold value or more, controlling the first motor for the speed of the first motor to have a speed inversely proportional to a size of the sensed load.

The controlling may include, based on the load sensed from the sensor being a third threshold value or greater than a first threshold value, terminating the operation of the first motor.

DETAILED DESCRIPTION OF EXEMPLARY EMBODIMENTS

The present embodiments may be applied with various modifications and there may be various embodiments. Accordingly, specific embodiments will be illustrated in the drawings and will be described in detail in the detailed description. However, it should be understood that the embodiments are not for limiting the scope of the specific forms of embodiment, but as including the various modifications, equivalents and/or alternatives of the embodiments disclosed herein. In describing the embodiments, like reference numerals may be used for like components.

In describing the present disclosure, in case it is determined that detailed descriptions of related known functions or configurations may unnecessarily confuse the gist of the present disclosure, the detailed description thereof will be omitted.

Additionally, the embodiments below may be modified in various different forms, and it should be noted that the scope of technological spirit of the present disclosure is not limited to the embodiments below. Rather, these embodiments are provided so that the present disclosure will be more thorough and complete, and to fully convey the technical spirit of the present disclosure to those skilled in the art.

The terminology used in the present disclosure is used for the purpose of describing the specific embodiments herein, and is not intended to be limiting the scope of the disclosure. A singular expression includes a plural expression, unless otherwise specified.

In the present disclosure, expressions such as "have", "may have", comprise", or "may comprise" are used to designate a presence of a characteristic (ex: numerical value, function, operation or element of a component, etc.), and not to preclude a presence or a possibility of additional characteristics.

In the present disclosure, expressions such "A or B", "A and/or B", or "at least one from A and/or B" may include all possible combinations of the listed items. For example, expressions such as "A or B", "at least one from A and B", or "at least one from A or B" may designate all cases of (1) including at least one of A, (2) including at least one of B, or (3) including at least one of A and at least one of B both.

The expressions such as "first" and "second" used in the present disclosure are used to modify the various elements regardless of order and/or importance, are merely used for the purpose of distinguishing one element from another element, and are not included to limit the relevant elements.

If a certain element (ex: first element) is disclosed as being "(operatively or communicatively) coupled with/to" or "connected to" another element (ex: second element), it should be understood that the certain element may be directly coupled to the another element or may be coupled through a different element (ex: third element). On the other hand, if a certain element (ex: first element) is referred to as being "directly coupled with/to" or "directly connected to" another element (ex: second element), it is to be understood that no different element (ex: third element) is present between the certain element and the another element.

The expression "configured to . . . (or set up to)" used in the present disclosure may be used interchangeably with for example, "suitable for . . . ", "having the capacity to . . . ", "designed to . . . ", "adapted to . . . ", "made to . . . ", or "capable of . . . " based on circumstance. The term "configured to . . . (or set up to)" may not necessary mean "specifically designed to" in terms of hardware.

Rather, in whichever circumstance, the expression "an apparatus configured to . . . " may mean to something that the apparatus "may be configured with . . . " another apparatus or components. For example, the phrase "a processor configured to (or set up to) perform A, B, or C" may mean a processor dedicated to perform a relevant operation (ex: embedded processor), or a generic-purpose processor (ex: a CPU or an application processor) capable of performing the relevant operations by performing one or more software programs stored in the memory apparatus.

In the embodiments, terms such as 'module' or 'part' are used to perform at least one function or operation, and may be implemented as hardware or software, or a combination of hardware and software. Further, a plurality of 'modules' or a plurality of 'parts', except for when the 'modules' or 'parts' need to be implemented to a specific hardware, may be integrated to at least one module to be implemented as at least one processor (not shown).

Herein, the present disclosure will be described in detail with reference to the accompanying drawings.

The embodiments of the present disclosure with reference to the accompanying drawings will be described in detail below for those of ordinary skill in the technical field to easily practice the invention. However, it should be noted that the present disclosure may be implemented to various different forms and is not limited to the embodiments described herein. Further, in the drawings, parts not related to the description have been omitted to clearly describe the present disclosure and like reference numerals are affixed to like parts throughout the specification.

Figure 1:
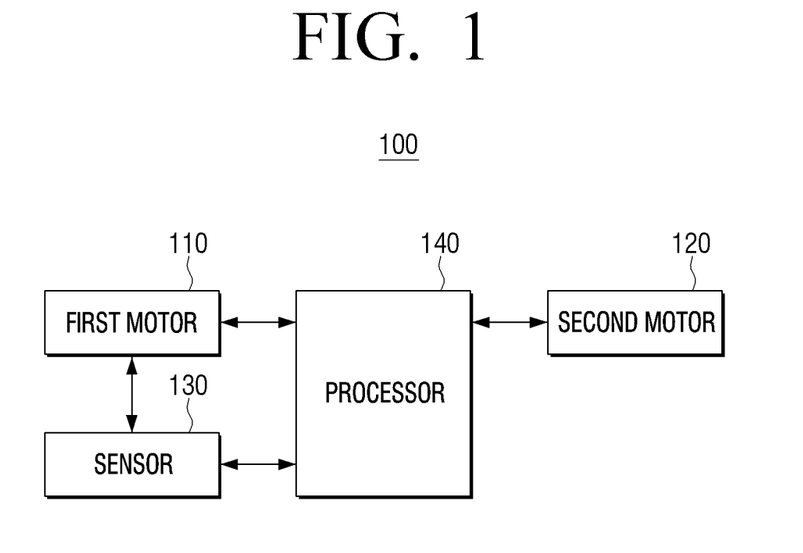
FIG. 1 is a block diagram provided to show a simple configuration of a vacuum cleaner according to an embodiment of the present disclosure.

FIG. 1 is a block diagram provided to show a simple configuration of a vacuum cleaner 100 according to an embodiment of the present disclosure.

Referring to FIG. 1, the present vacuum cleaner 100 may include a first motor 110, a second motor 120, a sensor 130 and a processor 140. The vacuum cleaner 100 is provided with a suction module separate from the main body and may be a canister type coupled by an extension pipe, or a suction module that may be an upright type integrally formed with the main body. In addition, the vacuum cleaner 100 may be a vacuum cleaner 100 of various forms such as a wireless control cleaner, a robot cleaner, a handy-type cleaner or the like.

The first motor 110 rotates a drum mounted with a brush. Specifically, based on a driving instruction for the first motor 110 being input and power being supplied to the first motor 110, the drum mounted with a brush is rotated by the driving of the first motor 110. The first motor 110 may be selected from various motors such as a direct current electric motor (DC motor), an alternating current electric motor (AC motor), a brushless DC electric motor (BLDC) or the like.

The drum is rotated by the driving of the first motor 110. Specifically, the drum may rotate using the kinetic energy of the first motor 110, and the drum may be in a cylindrical shape. The drum may be mounted with a brush to form one or more spiral trajectory along a circumferential surface thereof.

The brush is formed to protrude a predetermined length outside the suction inlet, and based on the drum rotating, attacks impurities such as dust, soil and hair clinging on to the surface to be cleaned. The impurities are then separated from the surface to be cleaned and may easily be suctioned by the suction inlet. The brush may be material of a small friction coefficient and strong abrasion resistance such as natural hair or polyamide (ex: nylon, PA), but is not limited thereto.

Figure 4:
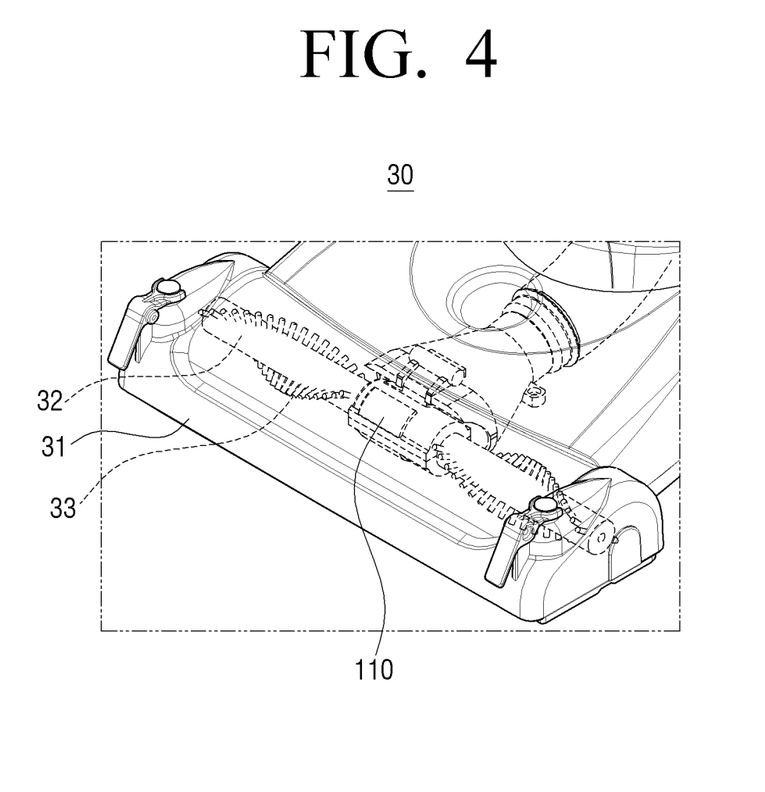
FIG. 4 is a diagram provided to specifically show a form of a suction module of FIG. 3.

The specific forms of the first motor, the drum, the brush and the suction inlet may be illustrated in FIG. 4.

The load applied to the first motor based on the type of surface to be cleaned may vary, and the size of the current supplied to the first motor 110 may vary accordingly.

For example, the load applied to the first motor based on surface to be cleaned being a carpet compared to the surface to be cleaned being a wood floor is greater, and the size of the current flowing to the first motor 110 accordingly also increases greatly. Even if the surface to be cleaned are both carpets, the size of the current flowing to the first motor 110 becomes relatively greater in the case the length of the carpet hair being longer and the friction coefficient being composed of a large material, than in the opposite case.

The sensor 130 may sense the load applied to the first motor 110, and may also sense a first current based on the load. Specifically, the sensor 130 may sense the size of the current supplied to the first motor 110 based on a voltage value at both ends of the resistance of the first motor 110. Further, a hall sensor 130 using a hall voltage is mounted and may use a method of sensing current of the first motor 110, and additionally, may use a sensor 130 of various different methods.

The second motor 120 may generate suction pressure. Specifically, based on the driving instructions for the second motor 120 being input and power being provided to the second motor 120, an impeller is rotated by the driving of the second motor 120. Suction pressure is generated by the rotation of the impeller and air including impurities is suctioned into the suction inlet by the suction pressure. Herein, as the speed of the second motor 120 increases, the suction pressure becomes greater.

The processor 140 controls the overall operation of the vacuum cleaner 100. The processor 140 controls the driving of the vacuum cleaner 100 based on a driving instruction of a user.

In this case, the processor 140 may selectively control whether or not to drive the first motor 110. That is, the processor 140 may, based on a driving instruction by a user, control the function of rotating the brush installed on the drum according to the driving of the first motor to perform an auxiliary role for the function of suctioning the impurities based on suction pressure according to the driving of the second motor.

The processor may then adjust suctioning force of the vacuum cleaner 100. Specifically, the processor 140 may, based on manipulation of the suction force adjusting part by a user, adjust the size of the suction pressure generated by the second motor 120. Further, as described below, the processor 140 may control various configurations in the vacuum cleaner 100 such as a processor 140, a first motor 110, and a second motor 120.

As described above, the load applied to the first motor 110 based by the type of surface to be cleaned may vary and the size of the current supplied to the first motor 110 may vary accordingly.

For example, based on the size of the current supplied to the first motor 110 increasing, the temperature of the first motor 110 may increase and a possibility of the first motor 110 being damaged may arise. If, the driving of the first motor 110 is terminated for a predetermined time considering these possibilities, as user may, in order to drive the first motor 110 again, press a power button to terminate the entire driving of the cleaner and then press the power button again to drive the cleaner again, having to endure an inconvenience.

To overcome problems such as the above, the processor 140 according to the present disclosure may control at least one from the first motor 110 and the second motor 120 according to the size of the load sensed from the sensor 130.

Based on the load sensed from the sensor 130 being greater than or equal to a first threshold value, a second threshold value or a third threshold value, and based on being less than the threshold values such as above, the specific control process that the processor 140 performs will be described below.

Herein, the first threshold value may be a value corresponding to 50% of the size of the load that may be sensed from the sensor 130, and the second threshold value smaller than the first threshold value may be a value corresponding to 30% of the size of the load that may be sensed from the sensor 130, and the second threshold value greater than the first threshold value may be a value corresponding to 70% of the size of the load that may be sensed from the sensor 130.

However, the numerical limitation such as the above are merely examples, and the size of the load corresponding to a specific threshold value may vary based on the first motor 110 used and other various factors. Accordingly, these threshold values are not limited to specific numerical values.

The processor 140 may, based on the load sensed from the sensor 130 being a first threshold value or more, reduce the speed of the second motor 120.

Specifically, the processor 140 may adjust the voltage applied to the second motor 120 and reduce the speed of the second motor 120. For example, the processor 140 may, based on adjusting a size of a sine wave and frequency for the voltage applied to the second motor 120, reduce the speed of the second motor 120.

However, in addition to the above methods, various methods for reducing the speed of the second motor 120 may be applied to the present disclosure, and specific details for reducing the speed of the second motor 120 may also be applied with respect to controlling the increase in speed of the second motor 120.

With the increase of speed of the second motor 120, the suction pressure is increased, thereby the brush and the surface to be cleaned is strongly in contact and while the load applied to the first motor 110 becomes greater, as the speed of the second motor 120 decreases, the contact force of the brush and the surface to be cleaned is reduced and the load applied becomes lesser. Accordingly, based on the speed of the second motor 120 being reduced, the size of the current supplied to the first motor 110 may be reduced.

The processor 140 may, based on the load sensed from the sensor 130 being a second threshold value or smaller than the first threshold value, the speed of the first motor 110 may be reduced. The control operation of this first motor 110 will be described in the description of FIG. 5.

The processor 140 may, based on the load sensed from the sensor 130 being a second threshold value or more, significantly reduce an effect according to the driving of the first motor 110 if the speed of the first motor is reduced excessively. Accordingly, the processor 140 may, based on maintaining the rotational force of the first motor 110, preferably reduce the speed of the first motor 110 within the range the current supplied to the first motor 110 may be reduced.

According to an embodiment considering these factors, the processor 140 may, based on the load sensed from the sensor 130 being a second threshold value or more, reduce the speed of the first motor 110 to 60% to 80% than a current speed.

However, the range of speed reduction such as the above is merely an example, and may vary according to the first motor 110 used and other various factors. Accordingly, this reduction range is not limited to a specific numerical range.

The processor 140 may, based on the load sensed from the sensor being a second threshold value or more, control the first motor 110 for the speed of the first motor to have a speed inversely proportional to a size of the sensed load.

For example, the processor 140 may, based on the load sensed from the sensor 130 being a second threshold value or more, reduce speed of the first motor 110 to 80% of a current speed, and may successively reduce to a value arriving from 100% to 80% inversely proportional to the size of the sensed load increasing.

Despite control of the processor 140 such as the above, there may be a case of the size of the sensed load successively increasing, and in this case terminating the driving itself of the first motor 110 may be preferable.

Accordingly, the processor 140 may, based on the load sensed from the sensor 130 being a third threshold value or greater than the first threshold value, terminate the driving of the first motor 110.

According to an embodiment, the processor 140 may, based on the load sensed from the sensor 130 being a specific threshold value or more, perform control concurrently, and may perform control after reaching a specific threshold value or more and a predetermined time has passed.

For example, the processor 140 may, based on the load sensed from the sensor 130 being a third threshold value or more, terminate driving of the first motor concurrently, and based on the load sensed from the sensor 130 being a third threshold value or more and thereafter not falling below the third threshold value for 5 seconds, terminate driving of the first motor 110.

There is no specific order determined between the control processes according to the present disclosure. For example, the processor 140 may, based on the load sensed from the sensor 130 being a second threshold value or more, first reduce the speed of the first motor 110, and based on the load sensed from the sensor 130 being a first threshold value or greater than the second threshold value despite the above, may reduce the speed of the second motor 120.

However, according to another embodiment of the present disclosure, the processor 140 may, based on the load sensed from the sensor 130 being a second threshold value or more, first reduce the speed of the second motor 120, and based on the load sensed from the sensor 130 being a first threshold value or greater than the second threshold value, may reduce the speed of the first motor 110.

In the above, the control process of a processor 140 in the case a load of a specific threshold value or more is sensed from the sensor 130 is described, but as described below, even in the case a load of less than a specific threshold value is sensed from the sensor 130, the processor may control at least one from the first motor 110 and the second motor 120.

That is, in case a load of a specific threshold value or more is sensed from the sensor 130 and the processor 140 reduces the speed of the first motor 110 or the speed of the second motor 120, or terminate driving of the first motor 110, and thereafter in case the load of a specific threshold value or less is sensed from the sensor 130, the processor 140 may be required to control the first motor 110 or the second motor 120 again.

According to an embodiment thereto, the processor 140 may, based on the load sensed from the sensor 130 being less than a third threshold value, drive the first motor 110.

Specifically, based on the processor 140 terminating the driving of the first motor when the load sensed from the sensor 130 reaches a third threshold value or more, and thereafter based on the load sensed from the sensor 130 being less than the third threshold value, the processor 140 may re-drive the terminated first motor 110.

However, in case the first motor is already being driven based on the load sensed from the sensor 130 failing to reach the third threshold value or more, the processor 140 may not perform a particular control.

The processor 140 may, based on the load sensed from the sensor 130 being less than a first threshold value, increase speed of the second motor 120.

Specifically, after the processor 140 reduces the speed of the second motor 120 based on the load sensed from the sensor 130 reaching a first threshold value or more, and in case the load sensed again from the sensor 130 is less than the first threshold value, the reduced speed of the second motor may be increased.

However, in case the speed of the second motor 120 has not been reduced based on the load sensed from the sensor 130 failing to reach the first threshold value or more, the processor 140 may not perform a particular control.

The processor 140 may, based on the load sensed from the sensor 130 being less than a second threshold value, increase speed of the first motor 110.

Specifically, after the processor 140 reduces the speed of the first motor 110 based on the load sensed from the sensor 130 being a second threshold value or more, and in case the load sensed again from the sensor 130 is less than the second threshold value, the reduced speed of the first motor 110 may be increased.

However, in case the speed of the first motor has not been reduced based on the load sensed from the sensor 130 failing to reach the second threshold value or more, the processor 140 may not perform a particular control.

According to an embodiment, the processor 140 may, based on the load sensed from the sensor 130 being less than a specific threshold value, perform control concurrently, and may perform control after reaching less than a specific threshold value and a predetermined time has passed.

For example, the processor 140 may, based on the load sensed from the sensor 130 being less than a specific threshold value, terminate driving of the first motor 110 concurrently, or after the load sensed from the sensor 130 becomes less than the third threshold value, may terminate driving of the first motor 110 in case the load fails to reach the third threshold value or more for five seconds.

There are not specific order determined between the control processes according to the present disclosure. For example, the processor 140 may, based on the load sensed from the sensor 130 being less than a first threshold value, first reduce the speed of the second motor 120, and based on the load sensed from the sensor 130 being less than a second threshold value smaller than the first threshold value despite the above, may reduce the speed of the first motor 110.

However, according to still another embodiment of the present disclosure, the processor 140 may, based on the load sensed from the sensor 130 being less than a first threshold value, first reduce the speed of the first motor 110, and based on the load sensed from the sensor 130 being less than a second threshold value smaller than the first threshold value despite the above, may reduce the speed of the second motor 120.

Figure 2:
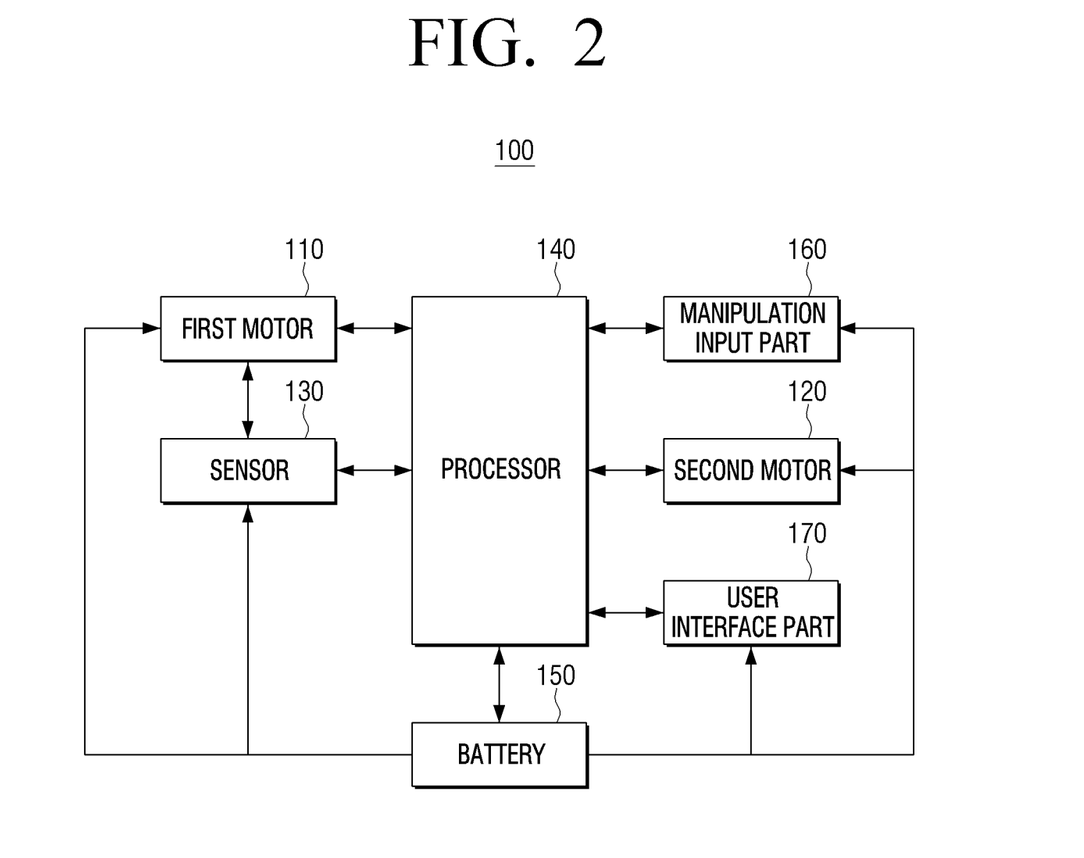
FIG. 2 is a block diagram provided to show a specific configuration of a vacuum cleaner according to an embodiment of the present disclosure.

In the above, a description based on a simple configuration of a vacuum cleaner 100 has been provided, but the vacuum cleaner 100 may further include configurations such as those illustrated in FIG. 2. The specific configuration of the vacuum cleaner 100 will be described below with reference to FIG. 2.

FIG. 2 is a block diagram provided to show a specific configuration of a vacuum cleaner 100 according to an embodiment of the present disclosure.

Referring to FIG. 2, the vacuum cleaner 100 according to an embodiment may include a first motor 110, a second motor 120, a sensor 130, a processor 140, a manipulation input part 160, a user interface part 170, and a battery 150.

The configuration of the first motor 110, the second motor 120 and the sensor 130 is the same as the configuration in FIG. 1 and repetitive descriptions will be omitted.

The manipulation input part 160 includes a power button, a suction force adjusting part, and the like, and may receive input of user manipulation of the vacuum cleaner 100.

Specifically, the user may, through the power button, input driving instruction of the vacuum cleaner 100, and the user may selectively manipulate whether or not to drive the first motor 110. That is, the user may manipulate the function of rotating the brush mounted on the drum according to the driving of the first motor as an auxiliary role for the function of suctioning the impurities based on suction pressure according to the driving of the second motor.

In addition, the user may manipulate the suction force adjusting part to adjust the size of the suction pressure generated by the second motor 120.

The user interface part 170 is configured to interact with the user of the vacuum cleaner 100. Specifically, the user interface part 170 may include an indicator, and may also additionally include a vibrator, a speaker, and the like. A specific embodiment related thereto will be described with the description for FIG. 6.

The processor 140 may, based on the user input being input to the manipulation input part 160, control each configuration of the vacuum cleaner 100. Further, the processor 140 may control the user interface part 170, and may also receive input on user interaction from the user interface part 170.

The processor 140 may include a read-only memory (ROM), a random-access memory (RAM), a graphic processing unit (GPU), a central processing unit (CPU), and a bus. Further, the ROM, RAM, GPU, CPU or the like may be inter-coupled through the bus.

The vacuum cleaner 100 according to the present disclosure includes a battery 150, and through the battery 150, may provide power to each configuration in the vacuum cleaner 100. Specifically, the battery 150 may supply power to the first motor 110, the second motor 120, the sensor 130, the processor 140, the manipulation input part 160, the user interface part 170, and the like.

According to an embodiment related thereto, the vacuum cleaner 100 may further include a secondary battery providing power to the first motor 110 and the second motor 120.

Herein, the secondary battery may be a nickel-cadmium (NiCd) battery, a nickel metal hydride (NiMH) battery, a lithium ion (Li-ion) battery, a lithium ion polymer (Li-ion polymer) battery) or the like, but are not limited to the types thereof.

The vacuum cleaner 100 according to an embodiment of the present disclosure such as the above may control the operation of the motor adaptively according to the load of the motor rotating the drum mounted with a brush. Accordingly, the user of the vacuum cleaner 100 may effectively clean without any inconvenience regardless of the use environment according to the various surfaces to be cleaned, as well as reduce the percentage of failures occurring in the vacuum cleaner 100.

Figure 3:
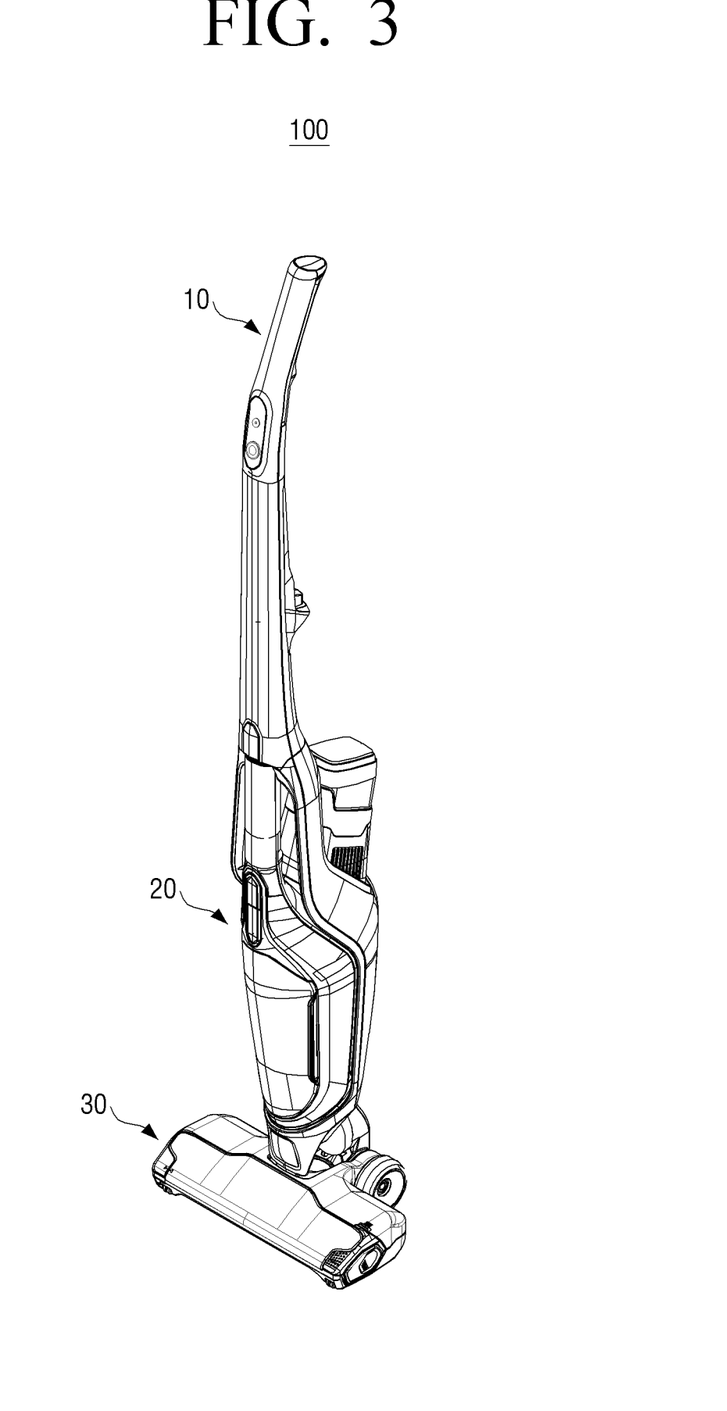
FIG. 3 is a diagram provided to show an exemplary form of a vacuum cleaner of the present disclosure.

FIG. 3 is a diagram provided to show an exemplary form of a vacuum cleaner 100 of the present disclosure.

As shown in FIG. 3, the vacuum cleaner 100 of the present disclosure may include a second motor and a main body 20 including an impeller rotated by the second motor 120, a suction module 30 coupled by the main body 20, and a handle 10 including a manipulation input part 160 and a user interface part 170.

The configuration of the handle 10 and the main body 20 have been described in the description of FIG. 2 and repetitive descriptions thereof will be omitted, and a detailed form of the suction module 30 will be described in detail with reference to FIG. 4.

Although a handy-stick type vacuum cleaner 100 is shown as an example among the various types of vacuum cleaners 100 in FIG. 3, the present disclosure it not limited to a specific type of vacuum cleaner 100. That is, the present disclosure may be implemented in a vacuum cleaner 100 of various types including a second motor 120 generating suction pressure together with the first motor 110 to rotate the drum mounted with a brush.

FIG. 4 is a diagram provided to specifically show a form of a suction module 30 of FIG. 3.

The suction module 30 may, as shown in FIG. 4, include a suction inlet 31 suctioning air included with impurities, a drum 32 rotated by the first motor 110, a brush 33 mounted on the drum 32, and a first motor 110 rotating the drum 32 mounted with the brush 33. The descriptions on each of the present configurations have been described above in the description of FIG. 1 and repetitive descriptions thereof are omitted.

Various types according to use thereof such as a general type and a bedding type are present in a suction module 30, and various types capable of being mounted with a brush 33, a drum 32, and a first motor 110 may be applied to the various embodiments of the present disclosure.

In addition, even if the suction module 30 may be for a same use, the suction module 30 may vary depending on the length of the brush 33, material or the like included therein. Further, the position mounted with the brush 33 in the suction module 30 may be variably selected.

Accordingly, the size of the load the specific suction module 30 has for the same surface to be cleaned may vary based on the length, material, mounting position or the like of the selected brush 33. In other words, the size of the load applied to the first motor 110 and the size of the current therefrom may not only vary according to the type of the surface to be cleaned but also to the type of the suction module 30.

According to an embodiment of the present disclosure with respect to the above, the vacuum cleaner 100 may further include a suction module 30 mounted to be detachable from the main body 20 and includes a drum 32 mounted with a brush 33 and a first motor 110, and the processor 140 may identify the type of the suction module 30 and based on the threshold value corresponding to the confirmed type, may control the speed of the second motor 120.

In this regard, an embodiment of providing a notification guiding to exchange the suction module 30 through the user will be described in the description of FIG. 6.

Figure 5:
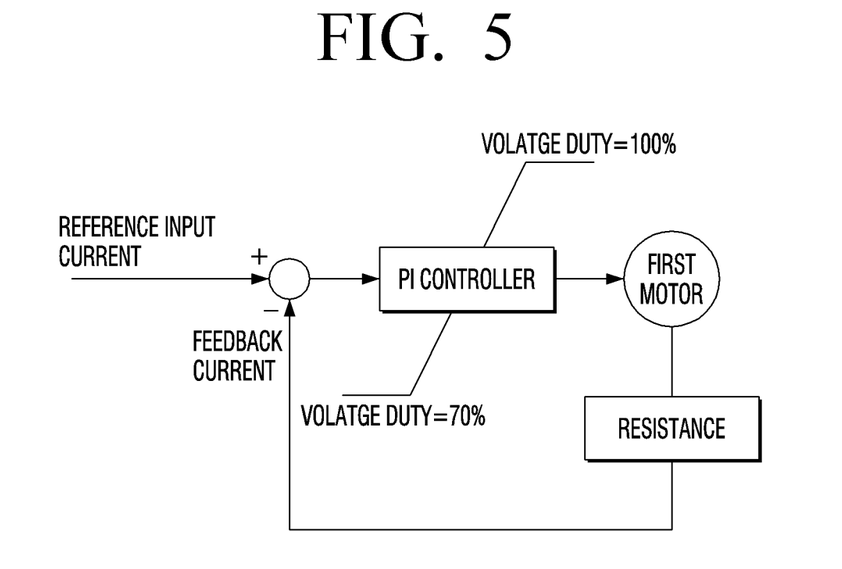
FIG. 5 is a diagram provided to specifically describe a control operation of a first motor of the present disclosure.

FIG. 5 is a diagram provided to specifically describe a control operation of a first motor 110 of the present disclosure.

As described above, the processor 140 may, based on the load sensed from the sensor 130 being a second threshold value or smaller than the first threshold value, reduce the speed of the first motor 110.

Referring to FIG. 5, the processor 140 may, based on the current value of the first motor 110 calculated according to the voltage at both ends of the resistance, control the voltage duty value applied to the first motor 110 through a proportional integral (PI) controller under a feedback system. Further, the size of the current supplied to the first motor 110 may hereby be controlled, and the speed of the first motor 110 may be controlled.

For example, the processor 140 may, based on the load sensed from the sensor 130 being a first threshold value or more, reduce the voltage duty value applied to the first motor 110 to 70%. The voltage duty value such as the above, while maintaining a rotational force of the first motor 110, may be determined within the range that may decrease the current supplied to the first motor 110.

In addition, the processor 140 may, based on the load sensed from the sensor 130 being a first threshold value or more, reduce the voltage duty value applied to the first motor 110 to 70%, and may successively reduce the value arriving from 100% to 70% inversely proportional to the size of the sensed load increasing.

However, the reduction range of the voltage duty such as the above is merely an example, and may vary based on the first motor 110 used and other various factors. Accordingly, the reduction range herein is not limited by a specific numerical limitation.

Further, in addition to the method of reducing voltage duty as a method for reducing the speed of the first motor 110, other various methods may be applied to the present disclosure, and the specific description on reducing the speed of the first motor 110 may be applied identically in terms of controlling the speed of the first motor 110.

Figure 6:
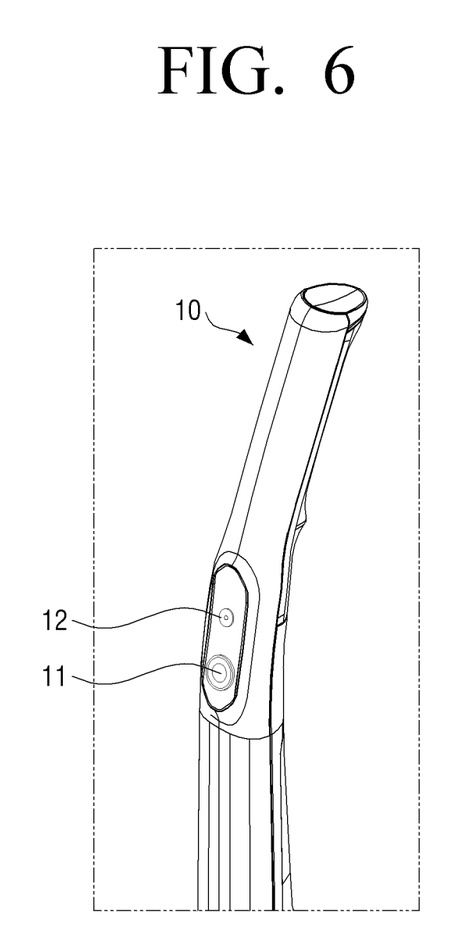
FIG. 6 is a diagram provided describe an embodiment of a vacuum cleaner provided with a user interface part.

FIG. 6 is a diagram provided describe an embodiment of a vacuum cleaner 100 provided with a user interface part 170.

Referring to FIG. 6, the handle 10 of the vacuum cleaner 100 may include an indicator 12 corresponding to one from a power button 11 and a user interface part 170. Although not shown, the user interface part 170 may include not only the indicator 12, but also a vibrator, a speaker, and the like.

In addition, as described above, the suction module 30 may be detachable from the main body 20, and the size of the load applied to the first motor 110 and the size of the current therefrom may vary according to the type of the suction module 30. Further, information on the load per the suction module 30 such as the above may be provided to the user in advance.

Accordingly, based on the load sensed from the sensor 130 being a specific threshold value or more or less than a specific threshold value, a notification guiding to exchange the suction module 30 is provided to the user, and based on the user selecting and exchanging the suction module 30 appropriate to the use environment, the object of the present disclosure may be achieved.

According to an embodiment such as the above, the vacuum cleaner 100 may further include a user interface part 170, and based on the load sensed from the sensor 130 being a first threshold value or more, the user interface part 170 may provide a notification guiding to exchange to a suction module 30 with a relatively lesser load than the currently mounted suction module 30.

The notification such as the above may be implemented in a method of providing visual information to the user through a sign.

For example, the vacuum cleaner 100 may, as shown in FIG. 6, further include an indicator 12 at a position easily recognizable visually by the user at the upper end of the handle 10 or the like, and may provide a notification guiding to exchange the suction module 30 to the user through switching on or off lighting or changing a lighted color of the indicator 12. Accordingly, the indicator 12 may be a light emitting diode (LED) indicator, but are not limited to the type thereof.

The providing of visual information such as the above, may further include a display by the vacuum cleaner 100, and may consist of a method displaying a text guiding to exchange the suction module 30 through the display.

The notifications such as the above may be implemented in a method of providing tactile information to the user through vibration.

For example, the vacuum cleaner 100 may further include a vibrator at a position easily recognizable tactilely by the user at the upper end of the handle 10 or the like, and may provide a notification guiding to exchange the suction module 30 by delivering a specific vibration to the user through the vibrator.

The notifications such as the above may be implemented in a method of providing auditory information to the user through voice.

For example, the vacuum cleaner may further include a speaker at a position easily recognizable audibly by the user at the upper end of the handle 10 or the like, and may provide a notification guiding to exchange the suction module 30 by delivering a specific voice to the user through the speaker.

Figure 7:
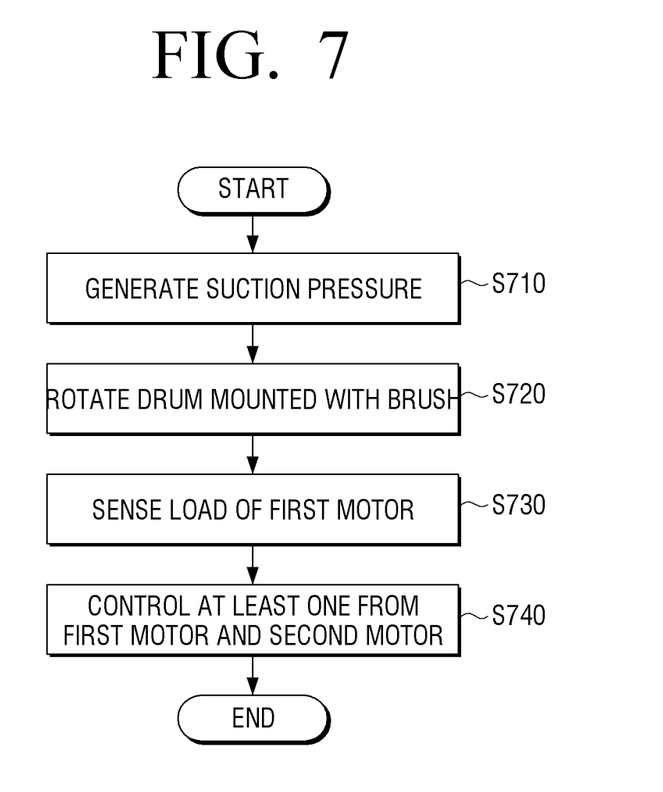
FIG. 7 is a flow chart provided to describe a controlling method of a vacuum cleaner according to an embodiment of the present disclosure.

FIG. 7 is a flow chart provided to describe a controlling method of a vacuum cleaner 100 according to an embodiment of the present disclosure.

First, based on a driving instruction being input to the vacuum cleaner 100, the second motor 120 is used to generate suction pressure S710, and the first motor 110 is used to rotate the drum 32 mounted with the brush 33 S720.

Then, the load applied to the first motor 110 is sensed S730, and at least one from the first motor 110 and the second motor 120 is controlled according to the size of the sensed load S740. The specific description regarding this control process will be described with reference to FIG. 8.

Figure 8:
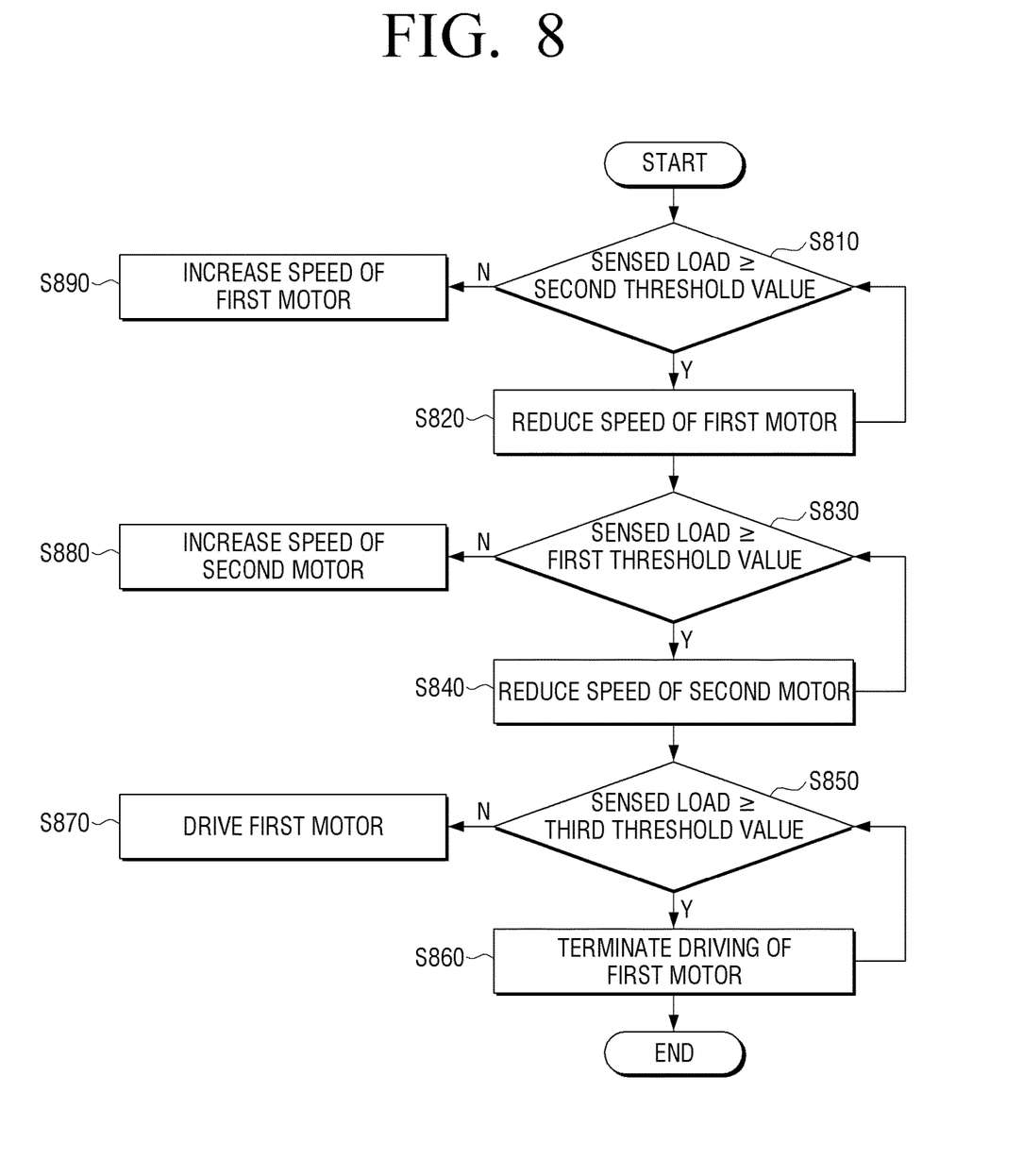
FIG. 8 is a flow chart provided to specifically describe a controlling method of a vacuum cleaner according to various embodiments of the present disclosure.

FIG. 8 is a flow chart provided to specifically describe a controlling method of a vacuum cleaner 100 according to various embodiments of the present disclosure. That is, based on the sensed load in sensing the load applied to the first motor as described in FIG. 7, the controlling at least one from the first motor and the second motor is specified below to describe various embodiments.

Specifically, according to an embodiment, based on the sensed load being a first threshold value of more S810, the speed of the second motor 120 may be reduced S820. In addition, based on the sensed load being a second threshold value or smaller than the first threshold value S830, the speed of the first motor 110 may be reduced S840. Further, based on the sensed load being a third threshold value or greater than the first threshold value S850, driving of the first motor 110 may be terminated S860.

Based on the sensed load being less than the third threshold value S850, the first motor 110 may be driven S870. In addition, based on the sensed load being less than the first threshold value S830, the speed of the second motor 120 may be increased S880. Further, based on the sensed load being less than the second threshold value S810, the speed of the first motor 110 may be increased S890.

As described above in the description of the processor 140 of the vacuum cleaner 100, based on the sensed load never having reached a specific threshold value or more prior to reaching less than a specific threshold value, a particular control may not be performed.

For example, based on the sensed load reaching the third threshold value or more and the driving of the first motor 110 has never been terminated, a particular control may not be performed even if the sensed load is less than the third threshold value.

Although not illustrated, the control method of the vacuum cleaner according to the present disclosure may, based on the sensed load being a second threshold value or more, reduce the speed of the first motor to 60% to 80% than a current speed.

Based on the sensed load being the second threshold value or more, the first motor may be controlled for the speed of the first motor 110 to have a speed inversely proportional to the size of the sensed load.

In describing the control method of the vacuum cleaner 100 above, the meaning of the used threshold value, the meaning of the threshold value or more and less than the threshold value, the increase and decrease of speed of the first motor, the increase and decrease of speed of the second motor, control of whether or not to drive the first motor, and the like have been described above, and a repetitive description thereof will be omitted.

The control method of the vacuum cleaner 100 according to an embodiment may be implemented to other various embodiments. However, the detailed description thereof have also been described above in the process of describing the processor 140 of the vacuum cleaner 100 according to the present disclosure, and thus a repetitive description thereof will be omitted.

According to the control method of a vacuum cleaner 100 according to the embodiment such as the above, the operation of the motor may be adaptively controlled according to the load of the motor rotating the drum 32 mounted with the brush 33. Accordingly, the user of the vacuum cleaner 100 may effectively clean without any inconvenience regardless of the use environment according to the various surfaces to be cleaned, as well as reduce the percentage of failures occurring in the vacuum cleaner 100.

The control method of the vacuum cleaner 100 as in FIGS. 7 and 8 may be executed on a vacuum cleaner 100 having the configuration of FIG. 1 or FIG. 2, and may also be executed on a vacuum cleaner 100 having other configurations.

The control method of a vacuum cleaner 100 according to the above described embodiments may be implemented as a program and provided to the vacuum cleaner 100. Specifically, the program including the control method of a vacuum cleaner 100 may be stored and provided in a non-transitory computer readable medium.

In addition, while the above illustrates and describes exemplary embodiments of the present disclosure, the present disclosure is not limited to the above described specific embodiments or the drawings, and it will be understood by those of ordinary skill in the art to which the present disclosure pertains that various changes in form and details may be made therein without departing from the spirit and scope as defined, and these various changes in form and details should not be understood as individual from the technical idea or scope of the present disclosure.

What is claimed is:

1. A vacuum cleaner, comprising:
a main body having a first motor configured to generate suction power, the main body configured to detachably mount a module including a drum having a brush and a second motor configured to rotate the drum;
a sensor configured to detect a load applied to the second motor; and
a processor configured to:
obtain, through the sensor, a first signal corresponding to the load applied to the second motor according to a floor type while the module is performing a cleaning operation,
obtain a second signal corresponding to a type of the module mounted to the main body, and
control a speed of the first motor for generating the suction power based on the first signal corresponding to the load applied to the second motor and the second signal corresponding to the type of the module while the first motor is driving, and
wherein the processor is further configured to, in response to identifying that the module mounted on the main body is a preset module based on the second signal and identifying that the load applied to the second motor is greater than or equal to a preset first threshold value based on the first signal, reduce the speed of the first motor.

2. The vacuum cleaner of claim 1, wherein the sensor comprises:
a first sensor configured to output the first signal according to the load applied to the second motor configured to rotate the drum, and
a second sensor configured to output the second signal according to the module mounted to the main body.

3. The vacuum cleaner of claim 1,
wherein the module is selected from a plurality of modules respectively customized for a particular floor type be cleaned, and
wherein the processor is further configured to control a rotation speed of the first motor according to the module mounted to the main body.

4. The vacuum cleaner of claim 1, wherein the processor is further configured to, based on the load being less than the first threshold value and being greater than or equal to a second threshold value, reduce a speed of the second motor while reducing the speed of the first motor, the second threshold value being less than the first threshold value.

5. The vacuum cleaner of claim 4, wherein the processor is further configured to, based on the load being greater than or equal to the second threshold value, reduce the speed of the second motor to 60% to 80% of a current speed.

6. The vacuum cleaner of claim 2, wherein the first sensor is configured to sense the load applied to the first motor based on a magnitude of a current supplied to the first motor.

7. The vacuum cleaner of claim 1, wherein the processor is further configured to, based on the load being greater than or equal to a third threshold value, terminate driving of the second motor, the third threshold value being greater than the first threshold value.

8. A control method of a vacuum cleaner, the vacuum cleaner comprising a main body having a first motor configured to generate suction power and a sensor configured to detect a load applied to a second motor, the main body configured to detachably mount a module including a drum having a brush and the second motor configured to rotate the drum, the control method comprising:

obtaining, through the sensor, a first signal corresponding to the load applied to the second motor according to a floor type while the module is performing a cleaning operation;

obtaining a second signal corresponding to a type of the module mounted to the main body; and controlling a speed of the first motor for generating the suction power based on the first signal corresponding to the load applied to the second motor and the second signal corresponding to the type of the module while the first motor is driving, wherein the method further comprises, in response to identifying that the module mounted on the main body is a preset module based on the second signal and identifying that the load applied to the second motor is greater than or equal to a preset first threshold value based on the first signal, reducing the speed of the first motor.

9. The control method of claim 8, wherein the sensor comprises:

a first sensor configured to output the first signal according to the load applied to the second motor configured to rotate the drum, and a second sensor configured to output the second signal according to the module mounted to the main body.

10. The control method of claim 8, wherein the module is selected from a plurality of modules respectively customized for a particular floor type be cleaned, and wherein the method further comprises controlling a rotation speed of the first motor according to the module mounted to the main body.

11. The control method of claim 8, wherein the method further comprises, based on the load being less than the first threshold value and being greater than or equal to a second threshold value, reducing a speed of the second motor while reducing the speed of the first motor, the second threshold value being less than the first threshold value.

12. The control method of claim 11, wherein the method further comprises, based on the load being greater than or equal to the second threshold value, reducing the speed of the second motor to 60% to 80% of a current speed.

13. The control method of claim 9, wherein the first sensor is configured to sense the load applied to the first motor based on a magnitude of a current supplied to the first motor.

14. The control method of claim 8, wherein the method further comprises, based on the load being greater than or equal to a third threshold value, terminating driving of the second motor, the third threshold value being greater than the first threshold value.

* * * * *